United States Patent
Kniffin et al.

(10) Patent No.: US 12,452,285 B2
(45) Date of Patent: Oct. 21, 2025

(54) ZERO TRUST CONTINUOUS RISK FEEDBACK

(71) Applicant: Omnissa, LLC, Mountain View, CA (US)

(72) Inventors: Martin Kniffin, Atlanta, GA (US); Siavash James Joorabchian Hawkins, Tonbridge, GA (US)

(73) Assignee: Omnissa, LLC, Mountain View, CA (US)

( * ) Notice: Subject to any disclaimer, the term of this patent is extended or adjusted under 35 U.S.C. 154(b) by 191 days.

(21) Appl. No.: 18/352,455

(22) Filed: Jul. 14, 2023

(65) Prior Publication Data

US 2025/0023900 A1   Jan. 16, 2025

(51) Int. Cl.
*H04L 9/40*  (2022.01)

(52) U.S. Cl.
CPC .................. *H04L 63/1433* (2013.01)

(58) Field of Classification Search
CPC .................................................. H04L 63/1433
See application file for complete search history.

(56) References Cited

U.S. PATENT DOCUMENTS

| | | | |
|---|---|---|---|
| 2015/0180892 A1* | 6/2015 | Balderas ............. | H04L 61/4511 726/22 |
| 2020/0077265 A1* | 3/2020 | Singh .................. | H04L 63/0272 |
| 2020/0089887 A1* | 3/2020 | Luthra ................. | G06F 21/577 |
| 2020/0162497 A1* | 5/2020 | Iyer ....................... | H04L 63/164 |
| 2020/0380522 A1* | 12/2020 | Perkal ................. | H04L 63/1483 |
| 2021/0273951 A1* | 9/2021 | Wang .................. | H04L 63/1433 |
| 2024/0119129 A1* | 4/2024 | Abdelaziz ........... | H04L 63/1425 |

FOREIGN PATENT DOCUMENTS

| | | | | |
|---|---|---|---|---|
| CA | 2757290 C | * | 12/2020 | ............. G06Q 30/02 |
| CN | 108200082 A | * | 6/2018 | ........... H04L 63/101 |
| CN | 114598504 A | * | 6/2022 | ............. H04L 63/20 |
| CN | 116074053 A | * | 5/2023 | ........... H04L 63/302 |
| CN | 116232953 A | * | 6/2023 | ......... H04L 43/0823 |
| CN | 118338296 A | * | 7/2024 | ............. H04L 43/08 |
| WO | WO-2018164701 A1 | * | 9/2018 | ............. G06N 20/20 |
| WO | WO-2019196549 A1 | * | 10/2019 | ......... G06Q 10/0635 |
| WO | WO-2023064007 A1 | * | 4/2023 | ......... H04L 63/1433 |
| WO | WO-2024263817 A1 | * | 12/2024 | ............... H04L 9/40 |

* cited by examiner

*Primary Examiner* — Sarah Su (74) *Attorney, Agent, or Firm* — Kim & Stewart LLP (57) ABSTRACT

Disclosed are various approaches for ensuring application integrity for enterprise resource access. In some examples, risk data for a client device is periodically received from a risk assessment service. The risk data is embedded into integrated data that includes the enterprise resources and the risk data. The integrated data is transmitted to a client device, and the integrated data causes the client device to provide a continuously updated risk user interface element in a user interface that provides the enterprise data.

20 Claims, 8 Drawing Sheets

ZERO TRUST CONTINUOUS RISK FEEDBACK

BACKGROUND

In an enterprise setting, virtual private networks, tunnels, and other protections can be utilized to protect application access to enterprise resources such as data files, function endpoints, and other items. Modern resource access solutions can enable users to access enterprise resources through various applications.

Initial access can be allowed or denied depending on a number of factors. However, once access is provided, no further checks are performed. In some examples, access systems can require some form of authentication. However, once authenticated, the access is provided without further consideration. Further examples can include providing an authentication token, but the token can have a lifespan that cannot be interrupted.

Modern work environments include users who may be using their personal device in a bring your own device (BYOD) scenario. The environment can also include users that utilize devices that can be easily moved from one place to another. The environment itself can also change to present security concerns even if the device is stationary. Since security concerns can dynamically change over time, static authentication types are subject to security concerns for enterprises. As a result, there is a need for improvements for authorization to access enterprise resources in various scenarios.

BRIEF DESCRIPTION OF THE DRAWINGS

Many aspects of the present disclosure can be better understood with reference to the following drawings. The components in the drawings are not necessarily to scale, with emphasis instead being placed upon clearly illustrating the principles of the disclosure. Moreover, in the drawings, like reference numerals designate corresponding parts throughout the several views.

DETAILED DESCRIPTION

Disclosed are examples of a system that ensures continuous risk feedback and authorization for zero trust access of enterprise resources. Resource access solutions can maintain a list of applications that can be allowed access to enterprise resources. As a result, applications have to be identified consistently in order to allow or deny application access to enterprise resources.

Initial access can be allowed or denied depending on a number of factors. For example, access systems can require authentication. However, once authenticated, the access is provided without further consideration. Modern work environments include users who may be using their personal device in a bring your own device (BYOD) scenario. The environment can also include users that utilize devices that can be easily moved from one place to another. The environment itself can also change to present security concerns even if the device is stationary. Since security concerns can dynamically change over time, static authentication types are subject to security concerns for enterprises.

The present disclosure provides for continuous authorization so that changing security considerations are continuously monitored. Further, since authorization is continuously reevaluated, feedback can be provided to users so that the user can understand and address or remediate security concerns that come up during the continuous authorization process.

Figure 1:
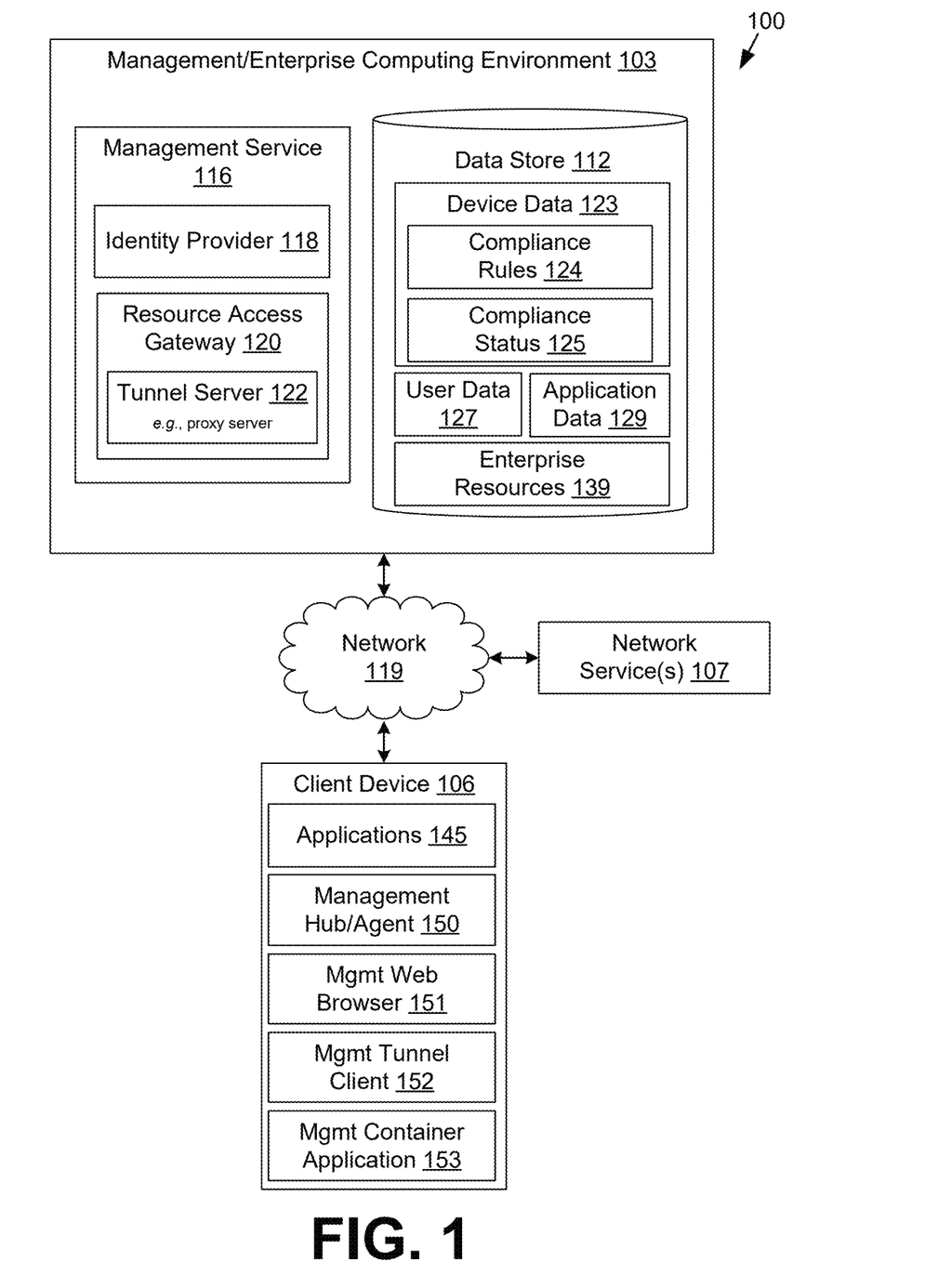
FIG. 1 is a block diagram depicting a networked environment according to various examples of the disclosure.

FIG. 1 illustrates an example of a networked environment 100 according to examples of the disclosure. In the depicted networked environment 100, an enterprise computing environment 103 is in communication with at least one client device 106 and a network service 107 over a network 119.

The network 119 includes the Internet, intranets, extranets, wide area networks (WANs), local area networks (LANs), wired networks, wireless networks, other suitable networks, or any combination of two or more such networks. The networks can include satellite networks, cable networks, Ethernet networks, and other types of networks.

The enterprise computing environment 103 can be a computing environment that is operated by an enterprise, such as a business or another organization. The enterprise computing environment 103 can also include or be described as a management computing environment of a management service that is employed or utilized by an enterprise. The enterprise computing environment 103 includes a computing device, such as a server computer that provides computing capabilities. Alternatively, the enterprise computing environment 103 can employ multiple computing devices that are arranged in one or more server banks or computer banks. In one example, the computing devices can be located in a single installation. In another example, the computing devices for the enterprise computing environment 103 can be distributed among multiple different geographical locations. In one case, the enterprise computing environment 103 includes multiple computing devices that together can form a hosted computing resource or a grid computing resource. Additionally, the enterprise computing environment 103 can operate as an elastic computing resource where the allotted capacity of computing-related resources, such as processing resources, network resources, and storage resources, can vary over time. In other examples, the enterprise computing environment 103 can include or be operated as one or more virtualized computer instances that can be executed to perform the functionality that is described herein.

Various applications or other functionality can be executed in the enterprise computing environment 103. Also, various data can be stored in a data store 112 that can be accessible to the enterprise computing environment 103. The data store 112 can be representative of a plurality of data stores 112. The data stored in the data store 112 can be associated with the operation of the various applications or functional entities described below.

The components executed on the enterprise computing environment 103 can include a management service 116, an identity provider 118, a resource access gateway 120 with a tunnel server 122, as well as other applications, services, processes, systems, engines, or functionality not discussed in detail herein. The management service 116 can be executed in the enterprise computing environment 103 to monitor and oversee the operation of one or more client devices 106 by administrators. In some examples, the management service 116 can represent one or more processes or applications executed by an enterprise mobility management (EMM) provider that facilitates administration of client devices 106 of an enterprise that are enrolled with the EMM provider. To this end, the operating system and application ecosystem associated with the client device 106 can provide various APIs and services that allow client devices 106 to be enrolled as managed devices with the management service 116. The identity provider 118, resource access gateway 120, and the tunnel server 122 can be considered part of the management service 116, since they can work in concert to perform management for an enterprise. In various examples these components can include shared as well as separate executables and data resources.

The management service 116 can include a management console that can allow administrators to manage client devices 106 that are enrolled with the management service 116. User interfaces can allow an administrator to define policies for a user account or devices associated with an enterprise environment. The user interfaces can also include, for example, presentations of statistics or other information regarding the client devices 106 that can be managed by the management service 116.

The enterprise computing environment 103 can also execute an identity provider 118. The identity provider 118 can carry out federated user authentication on behalf of an enterprise. For example, the identity provider 118 can implement OAuth, Security Assertion Markup Language (SAML), or similar protocols that allow for federated user authorization or authentication. In examples of this disclosure, the identity provider 118 can also verify a user-and-device token provided by a client device 106 to provide multi-device single sign-on (SSO) capabilities as described herein. The identity provider 118 can verify a user's credentials or identity and provide an authentication token, such as a SAML assertion, that can be provided to a network service 107 by an application on a client device 106 to authenticate the user's access to a service provided by the network service 107. The identity provider 118 can issue the authentication token to a client device 106 after verifying the identity of the user and/or client device 106 from which the user is attempting to access the network service 107. In the context of this disclosure, once a user has authenticated his identity from a first device, the identity provider 118 can authenticate the user from a second device that is managed by the management service 116 upon receiving a user-and-device token from the second device, where the user-and-device token can be verified by the identity provider 118.

The identity provider 118 can verify a user-and-device token issued by the management service 116 to a client device 106 that is enrolled as a managed device and that is associated with a particular user account. The user-and-device token can include information that allows the identity provider 118 to verify the user as well as the device. The user-and-device token can be signed so that the identity provider 118 can verify the authenticity of the token itself.

If the user has already established his identity with the identity provider 118 from a first device, and the identity provider 118 subsequently receives a user-and-device token from a second device, the identity provider 118 can establish an SSO session with the second device if the user-and-device token can be validated. Validation can be performed by verifying the signature applied to the user-and-device token as well as the user and device identifying information contained within the token.

In some embodiments, the identity provider 118 can be implemented in a separate computing environment or by a separate entity other than the management service 116. The identity provider 118 can provide an application programming interface (API) with which the management service 116 can communicate to verify a user-and-device token or to obtain a public key with which the signature of a user-and-device token can be verified. The identity provider 118 can also provide an API through which the management service 116 can verify user identifiers or device identifiers that are embedded within a user-and-device token. Alternatively, the management service 116 can provide the API and the identity provider 118 can communicate to verify a user-and-device token or to obtain a public key with which the signature of a user-and-device token can be verified. The management service 116 can also provide an API through which the identity provider 118 can verify user identifiers or device identifiers that are embedded within a user-and-device token.

The management service 116 and/or identity provider 118 can also receive application usage data from applications or a management component installed on the client device 106. Applications on the client device 106 can report time and date information associated with the application usage. Additionally, cloud-based services can report login and logout information to the management service 116 or identity provider 118. An SSO client application that operates as a hub to access enterprise applications can be installed on a client device 106 and can report usage of enterprise applications to the management service 116 or identity provider 118.

The management service 116 or identity provider 118 can also obtain usage of VDI resources associated with a user from a VDI infrastructure environment. A VDI infrastructure environment can utilize the identity provider 118 for identity management and also report usage data to the management service 116 in some instances.

The resource access gateway 120 can refer to a component of the management service 116 that continuously monitors compliance status 125 including risk assessment information, and secures access to enterprise resources 139 by permitting and denying access, and providing this information to the client device 106 for generation of a continuous risk interface using a display or other interface hardware of the client device 106.

The tunnel server 122 can provide a virtual private network (VPN) connection or other type of tunnel to an enterprise or private network. The VPN tunnel can be provided to client devices 106 associated with users of the enterprise. The VPN tunnel can be initiated by a tunnel client running on a client device 106 and terminated at the tunnel server 122. The tunnel server 122 can utilize Transport Layer Security (TLS), Secure Socket Layer (SSL), or other encryption methodologies to secure a network connection between the client device 106 and the tunnel server 122. The tunnel server 122 can also include a proxy server. The network connection can also be specific to certain apps that are running on the client device 106, such as a tunnel client or other applications on the client device 106 that utilize per-app VPN capabilities of an operating system on the client device 106.

The data stored in the data store 112 can include device data 123, user data 127, application data 129, enterprise resources 139, and potentially other data. Device data 123 can include records to client devices 106 that are enrolled as managed devices with the management service 116. A record within the device data 123 can include various security settings selected for enforcement on a client device 106 that is enrolled with the management service 116.

Accordingly, a device record can include device data 123 including a device identifier associated with a device, such as the client device 106 and other data associated with managed devices. Device data 123 can also include periodically and continuously updated telemetry information regarding the client devices 106. Any of the items of device data 123 can be considered telemetry information. The management service 116 can transmit instructions for the management agent 150 to monitor certain device data 123 and transmit it to a risk assessment service provided by the management service 116 or a third party network service 107. If a third party network service 107 provides the risk assessment service, then components of the management service 116 can retrieve the risk score information over the network 119.

Device data 123 can also identify a user associated with, logged into, or assigned to a particular client device 106. A device record can also store other device specific information, such as a device type, operating system type or version, applications that are required or optional for the device, or an enrollment status of the device. In this scenario, the device data 123 can also indicate whether a managed device is a computing device or a peripheral device, such as a printer, scanner, or another device that can be deployed in an environment and associated with a record in a directory service.

This device data 123 can include the peer-to-peer, local, and wide area networks and network settings of the client device 106, which can change as a result of user actions and device movement. For example, a user can move the client device 106 and can automatically or manually connect to or disconnect from various peer-to-peer, local, and wide area networks that can be allowed or disallowed according to a compliance rule 124. The device data 123 can include device settings that are allowed or disallowed according to compliance rules 124 maintained by the management service 116 for a user account, client device 106, or enterprise group. The management service 116 can assess device data 123 to identify various conditions according to a set of condition definitions for the various compliance rules 124.

A compliance status 125 of a client device 106 represents whether the device is in compliance with one or more compliance rules 124. Various compliance rules 124 can be enforced by the management service 116 by the client device 106. Compliance rules 124 can be based on time, geographical location, or device and network properties. For instance, the client device 106 can satisfy a compliance rule 124 when the client device 106 is located within a particular geographic location. The client device 106 can satisfy a compliance rule 124 in other examples when the client device 106 is in communication with a particular local area network, such as a particular local area network that is managed by the enterprise computing environment 103. Furthermore, a compliance rule 124 in another example can be based upon the time and date matching specified values.

A compliance rule 124 can specify that a client device 106 is required to be off or in a low power "sleep" state during a specified time period. Another compliance rule 124 can specify that a client device 106 is required to be on or in a normal operation "awake" state during a specified time period. As another example, a compliance rule 124 can specify that a client device 106 is prohibited from rendering content that has been designated as confidential.

Another example of a compliance rule 124 involves whether a user belongs to a particular user group. For instance, a compliance rule 124 can specify which particular users or groups of users are authorized to perform various functionalities, such as installing or executing a particular application.

Other examples of compliance rules 124 include a rule that specifies whether a client device 106 is compromised or "jailbroken." For example, a client device 106 can have hardware or software protections in place that prevent unauthorized modifications of the client device 106. If these protections are overridden or bypassed, the client device 106 can be considered out of compliance. As another example, a compliance rule 124 can specify that the client device 106 is required to prompt a user for a phrase, word, number, pattern, or other type of user secret, depending on the type of mobile device in use. Nonlimiting examples can include a password or personal identification number (PIN) that can unlock the device.

A compliance rule 124 can also require that the client device 106 be device encryption enabled, where data stored on the device is stored in an encrypted form. The data can be encrypted by a device certificate. A compliance rule 124 can also specify that the client device 106 is enrolled with the management service 116 as a managed device. Another compliance rule 124 can specify that the user is required to accept the terms of service that are presented by the management hub 150 on the client device 106. As another example, a compliance rule 124 can specify that the management hub 150 is required to periodically communicate or "check-in" with the management service 116 to report on its status. If a threshold amount of time has elapsed since the previous check-in of the client device 106, the device can be considered to have violated this compliance rule 124.

Another compliance rule 124 can specify that a client device 106 be running one of a specified variants or versions of a particular operating system, and must include a particular set of security patches for the operating system. A compliance rule 124 can also specify that an enrolled device be manufactured by a particular manufacturer or have a particular manufacturer identifier. Another compliance rule 124 can specify that an enrolled device be a particular model name or model number. A client device 106 can also be considered out of compliance if the device is in a data roaming mode or has used a threshold amount of a periodic network data usage allowance.

Accordingly, the compliance status 125 indicates whether and to what extent a particular client device 106 is compliant with compliance rules 124 assigned to the client device 106 by the management service 116. The compliance status 125 can be determined by a management hub 150 on the client device 106 that analyzes the status of the client device 106 and reports compliance information to the management service 116 or a risk assessment service. In other examples, the compliance status 125 can be determined by the management service 116 based upon information about the status of the client device 106 that is reported by the management hub 150.

User data 127 contains information about user accounts in a user directory. User accounts can be maintained by a directory service or the identity provider 118. The user accounts can be associated with client devices 106 that are enrolled with the management service 116. The user data 127 can be associated the same user accounts that are verified by the identity provider 118. In some implementations, the identity provider 118 can rely upon a separate set of user account data or a user directory to determine whether to issue an authentication token to an application on behalf of the user. In other implementations, the user data 127 is a user directory associated with the identity provider 118, and the management service 116 accesses the user data 127 through an API provided by the identity provider 118.

User data 127 can include profile information about a user, authentication information about a user, applications that are installed on client devices 106 associated with the user, and other user information. For example, user data 127 can include information about client devices 106 that are associated with a user account of the user, and enterprise resources 139 to which a particular user has access, such as email, calendar data, documents, media, applications, network sites, or other resources. The user data 127 can also identify one or more user groups of which a particular user is a member, which can in turn define the access rights of the user to one or more enterprise resources 139 as well as identify which applications should be deployed to a client device 106 associated with the user. To this end, the user data 127 can further identify one or more device identifiers that can uniquely identify client devices 106 that are associated with a user account of the user.

The network service 107 can be a computing environment that is operated by an enterprise, such as a business or another organization. The network service 107 includes a computing device, such as a server computer, that provides computing capabilities. Alternatively, the network service 107 can employ multiple computing devices that are arranged in one or more server banks or computer banks. In one example, the computing devices can be located in a single installation. In another example, the computing devices for the network service 107 can be distributed among multiple different geographical locations. In one case, the network service 107 includes multiple computing devices that together can form a hosted computing resource or a grid computing resource. Additionally, the network service 107 can operate as an elastic computing resource where the allotted capacity of computing-related resources, such as processing resources, network resources, and storage resources, can vary over time. In other examples, the network service 107 can include or be operated as one or more virtualized computer instances that can be executed to perform the functionality that is described herein.

The network service 107 can be hosted by a third party and provide various services to users of the enterprise. The services can be considered third-party-hosted or provided enterprise resources 139. As a result, providing access to the enterprise resources 139 can include providing a VPN tunnel using the tunnel server 122 or providing identity services by the identity provider 118 that provides access to a network service 107. Access to the network service 107 can be federated to the identity provider 118 in some examples. Users can utilize a client, application 145, or a user interface generated by the network service 107 to access email, calendars, contacts, program services, desktop services, and other resources.

The client device 106 can represent multiple client devices 106 coupled to the network 119 using wired and wireless network connections. The client device 106 includes, for example, a processor-based computer system. According to various examples, a client device 106 can be in the form of a desktop computer, a laptop computer, a personal digital assistant, a mobile phone, a smartphone, or a tablet computer system. The client device 106 can represent a device that is owned or issued by the enterprise to a user, or a device that is owned by the user. The client device 106, when provisioned, can be enrolled with the management service 116 as a managed device of the enterprise.

The client device 106 can execute a management hub 150 that can communicate with the management service 116 to facilitate management of the client device 106. The management hub 150 can communicate with the management service 116 to enforce management policies and compliance rules 124 on the client device 106. For example, the management hub 150 can enforce data security requirements, install, remove or update security certificates, or write, modify or delete certain data from the client device 106. The management hub 150 can also monitor network activity of the client device 106, the location of the client device 106, enforce password or personal identification number (PIN) requirements, or any other security or acceptable-use policies that are defined in the management service 116 and sent to the management hub 150 over the network 119.

To carry out local management of a client device 106, various management components can be executed on the client device 106. The management components can include a management agent or hub 150, a management web browser 151, a management tunnel client 152, and a management container application 153. Various actions referred to as performed by a particular management component can alternatively be performed using any of the other management components. The management components can be installed and executed with elevated or administrative privileges on the client device 106. In some scenarios, the operating system can allow a particular application or package to be identified as a device owner or a device administrator.

One or more applications 145 can be installed on the client device 106. As a managed device that is enrolled with the management service 116, some applications 145 can be installed by the management service 116. In one scenario, the management service 116 can send a request to the management hub 150 to retrieve and install a particular application 145 on the client device 106. In this sense, installation of the application is initiated by the management service 116. The management service 116 can also provide configuration data for a particular application 145 that is installed on the client device 106. An application 145 can include any one of the management components.

The enterprise or management hub application 150 can include an SSO application through which a user can authenticate his or her identity in concert with the identity provider 118 in order to access enterprise resources 139. Such an application can collect application usage data for applications 145 associated with the enterprise and report the usage data to the management service 116 or the identity provider 118. In some examples, the management hub 150 can be considered an application 145. The management hub application 150 can generate a continuous risk interface for display or audible presentation using hardware components connected to or integrated with the client device 106. The client device 106 can include a managed client device 106, however, the aspects of the continuous risk user interface can apply to unmanaged client devices 106 that can access managed applications and web content generated by the management service 116.

A management web browser 151 can include a web browser that includes customized or bespoke components that integrate with the management service 116 and the resource access gateway 120. In some examples, the management web browser 151 can include instructions that generate a continuous risk interface for display or audible presentation using hardware components connected to or integrated with the client device 106.

A management tunnel client 152 can be installed on a client device 106 to provide a VPN connection that is terminated at the tunnel server 122. The VPN connection can be an encrypted network connection that provides access to internal enterprise networks for applications 145 executed by the client device 106. The VPN connection, in some instances, can also simply encrypt network traffic between the client device 106 and the network 119 for security purposes. In some implementations, rather than utilizing a management tunnel client 152 that sets up a VPN connection with the tunnel server 122, per-app VPN capabilities of an operating system of the client device 106 can be utilized. The management tunnel client 152 can communicate with the tunnel server 122 to provide certain applications 145 with access to a predetermined gateway or subnetwork that provides a subset of the enterprise resources 139, according to the application integrity configuration data 135.

A management container application 153 can include a container application that provides access to web applications 145 and installable applications 145 that are executed in individual or shared containers. The management container application 153 can generate the individual or shared containers as a sandboxed environment for the various web applications 145 and installable applications 145, which can be utilized to access the enterprise resources 139. The management container application 153 can include customized executable components that integrate with the management service 116 and the resource access gateway 120. In some examples, the management container application 153 can include instructions that generate a continuous risk interface for display or audible presentation using hardware components connected to or integrated with the client device 106.

Figure 2:
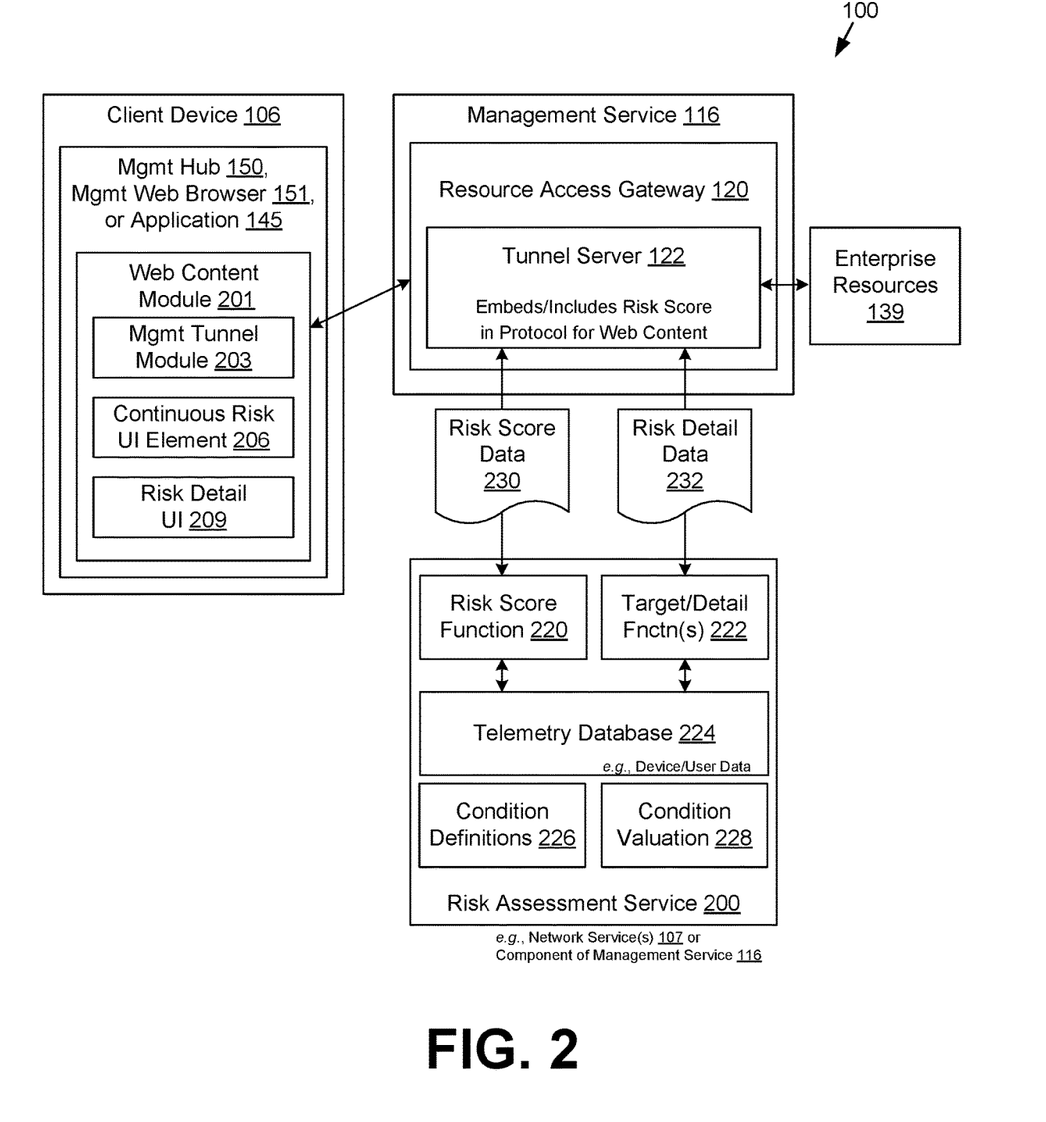
FIG. 2 is a block diagram depicting an overview of an example implementation according to various examples of the disclosure.

Referring next to FIG. 2, shown is an example implementation of zero trust continuous risk feedback using the components of the networked environment 100. Generally, this implementation shows how the components of the networked environment 100 can provide continuous risk feedback within web content. In this example, the components of the management service 116 can communicate with a risk assessment service 200 as well as one or more client devices 106.

The management service 116 can include a resource access gateway 120 and a tunnel server 122 that operate to provide and secure access to the enterprise resources 139 in concert with a web content module 201 executed in the client device 106 as part of another program. For example, the custom web content module 201 can be executed within the management hub 150, the management web browser 151, or another application 145 that integrates the web content module 201. The web content module 201 can provide or be referred to as a web view or embedded web view.

The web content module 201 can include a customized executable program, software development kit (SDK), or another module provided to integrate with the resource access gateway 120 and a tunnel server 122. As a result, it can be considered a management component, whether it is provided as a customized plugin or component of the management hub 150, the management web browser 151, or another application 145 provided by the management service 116 or a third party.

The risk assessment service 200 can include a risk score query function 220 and one or more detail query functions 222. These functions can be queried or subscription based functions that generate and publish risk score data 230 as well as risk detail data 232 based on the information in the telemetry database 224. The telemetry database 224 can include device data 123 and user data 127. The risk assessment service 200 can receive the device data 123 and the user data 127 from the management service 116, or from the client devices 106. The risk assessment service 200 can store the device data 123 and the user data 127 in the telemetry database 224. In various examples, the risk assessment service 200 can be part of the management service 116 or a third party network service 107.

The risk score data 230 can indicate a score generated using condition definitions 226 and configurable condition valuations 228. The risk detail data 232 can include information that indicates one or more risk factors currently affecting the client device 106. The risk factors can include conditions defined by the condition definitions 226.

The risk assessment service 200 can also store condition definitions 226 and condition valuations 228. The condition definitions 226 can refer to various device states and configurations as well as user actions that are evaluated to generate a security-related risk score data 230. The condition definitions 226 can include states and configurations used for compliance rules 124 as well as others. The condition valuations 228 can include weights or values for each condition definition 226. An administrator or user can manipulate user interface elements of a management console of the management service 116 or user interface of the risk assessment service 200 to configure the condition valuations 228.

The resource access gateway 120 and the tunnel server 122 can receive or retrieve risk score data 230 and risk detail data 232 by querying or subscribing to the risk score query function 220 in relation to an identifier associated with the client device 106. The risk score query function 220 can include one or more algorithms that can generate a risk score data 230 for a client device 106 by assessing device data 123 and user data 127 according to the condition definitions 226 and condition valuations 228. The resource access gateway 120 can provide the risk score data 230 to the web content module 201 to generate and update the continuous risk user interface element 206. The continuous risk user interface element 206 can include a continuously updated indication of risk based on the risk score data 230 integrated with a user interface providing enterprise resources 139. Continuously updated can indicate that updated risk information which is updated in a manner that continues to update on a periodic or regular basis while the enterprise resources 139 are being accessed.

The detail query function 222 can include one or more algorithms that can generate risk detail data 232 using the information in the telemetry database 224. The resource access gateway 120 can provide the risk detail data 232 to the web content module 201 to generate and update the risk detail user interface 209. The risk detail user interface 209 can include detailed information that describes the risks, indicates pending and potential actions that the management components can take if the risk continues or increases, and describes how the user can remediate the risk to prevent these actions. In various examples, the risk detail user interface 209 can refer to an update shown using the continuous risk user interface element 206 or a separate user interface that is generated in response to a user interaction with the continuous risk user interface element 206.

The enterprise resources 139 can be accessed through a web content portal of the resource access gateway 120, and the resource access gateway 120 can embed or inject risk score data 230 and risk detail data 232 into a protocol that provides web content such as a website or a web application 145 for the client device 106. For example, the proxy or tunnel server 122 can implement a handshake using Socket Secure (SOCKS) or can communicate using another data protocol that provides web content such as Hypertext Transfer Protocol (HTTP). The web content protocol can be proprietary or nonproprietary, and can have customizable sections into which the risk score data 230 and risk detail data 232 can be embedded.

The resource access gateway 120 can also use a tunnel server 122 to provide a VPN tunnel in concert with the management tunnel module 203. As enterprise resources 139 are accessed, the components of the resource access gateway 120 can continuously or periodically receive risk score data 230 from the risk assessment service 200. The resource access gateway 120 can then embed or inject the risk score in a protocol for web content that is used to provide access to the enterprise resources 139. As a result, the web content module 201 can generate the continuous risk user interface element 206 as a user interface element within the web content, or the web content itself can include the user interface element as it is transmitted from the resource access gateway 120 to the client device 106.

User selection of the user interface element can cause the web content module 201 to generate the risk detail user interface 209. In some examples, the web content module 201 can request risk detail data by transmitting a request to the resource access gateway 120, the resource access gateway 120 can identify pre-stored risk detail data 232 or retrieve this data from the risk assessment service, and can return the pre-stored risk detail data 232 to the web content module 201. Alternatively, the risk detail data 232 can be embedded into the web content continuously, but the risk detail user interface 209 can remain hidden until a user interacts with a user interface element.

Figure 3:
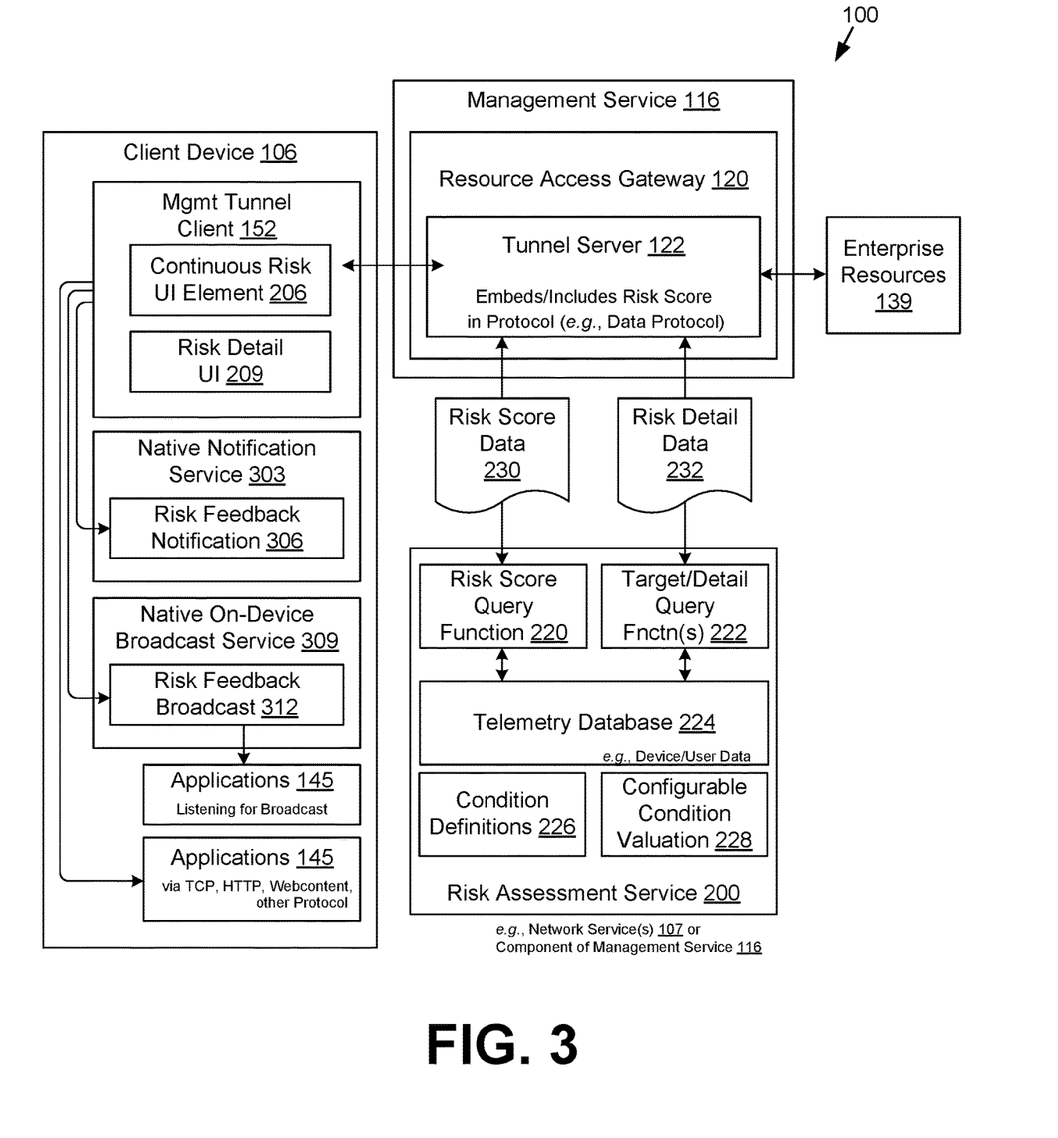
FIG. 3 is a block diagram depicting an overview of an example implementation according to various examples of the disclosure.

FIG. 3 shows another example implementation of zero trust continuous risk feedback using the components of the networked environment 100. Generally, this implementation shows how the components of the networked environment 100 can provide continuous risk feedback within a data protocol handled by the management tunnel client 152 or a management proxy client. The components of the management service 116 can communicate with a risk assessment service 200 as well as one or more client devices 106. The management service 116 can include a resource access gateway 120 and a tunnel server 122 that operate to provide and secure access to the enterprise resources 139 in concert with a management tunnel client 152 executed in the client device 106. The resource access gateway 120 and the tunnel server 122 can receive or retrieve risk score data 230 and risk detail data 232 by querying or subscribing to the risk score query function 220 in relation to an identifier associated with the client device 106. The resource access gateway 120 can provide the risk score data 230 to the management tunnel client 152 to generate and update the continuous risk user interface element 206. The continuous risk user interface element 206 can include a continuously or periodically updated indication of risk based on the risk score data 230.

The resource access gateway 120 can provide the risk detail data 232 to the management tunnel client 152 to generate and update the risk detail user interface 209. The risk detail user interface 209 can include detailed information that describes the risks, indicates pending and potential actions that the management components can take if the risk continues or increases, and describes how the user can remediate the risk to prevent these actions. In various examples, the risk detail user interface 209 can refer to an update shown using the continuous risk user interface element 206 or a separate user interface that is generated in response to a user interaction with the continuous risk user interface element 206.

The resource access gateway 120 can provide the enterprise resources 139 using a tunnel server 122 that works in concert with the management tunnel client 152. As enterprise resources 139 are accessed, the components of the resource access gateway 120 can continuously or periodically receive risk score data 230 from the risk assessment service 200. The resource access gateway 120 can then embed or inject the risk score in a data protocol that is used to communicate the enterprise resources 139 through a VPN tunnel. For example, the proxy or tunnel server 122 can implement a handshake using Socket Secure (SOCKS) or can communicate using another data protocol such as Hypertext Transfer Protocol (HTTP), File Transfer Protocol (FTP), Internet Protocol (IP), Simple Mail Transport Protocol (SMTP), User Datagram Protocol (UDP), and others. The data protocol can be proprietary or nonproprietary, and can include web content protocols as well as other protocols. The data protocol can have customizable sections into which risk score data 230 and risk detail data 232 can be embedded.

The management tunnel client 152 can generate the continuous risk user interface element 206 as a user interface element within the web content, or the web content itself can include the user interface element as it is transmitted from the resource access gateway 120 to the client device 106. User selection of the user interface element can cause the management tunnel client 152 to generate the risk detail user interface 209. The management tunnel client 152 can generate the continuous risk user interface element 206 and the risk detail user interface 209 in its own application interface, or as an overlay or modification of a user interface of an application 145.

The management tunnel client 152 can request risk detail data by transmitting a request to the resource access gateway 120, the resource access gateway 120 can identify pre-stored risk detail data 232 or retrieve this data from the risk assessment service, and can return the pre-stored risk detail data 232 to the management tunnel client 152. Alternatively, the risk detail data 232 can be embedded into the protocol continuously, but the risk detail user interface 209 can remain hidden until a user interacts with a user interface element.

The management tunnel client 152 can also post or transmit risk score data 230 and risk detail data 232 as notifications to a native notification service 303 of the client device 106. The native notification service 303 can provide or surface a risk feedback notification 306 using the client device 106. The risk feedback notification 306 can include an indication of risk based on the risk score data 230. A user can interact with the risk feedback notification 306 to open or display the risk detail user interface 209.

The management tunnel client 152 can also cause a native on-device broadcast service 309 of the client device 106 to provide a risk feedback broadcast 312 using a native on-device broadcast service 309. This can include using an Android® Broadcast Intent in an Android® device. The native on-device broadcast service 309 can enable applications 145 that listen for the broadcast to receive risk score data 230 or a continuous risk user interface element 206 using the broadcast. In some examples, for example, if the risk passes a threshold, the management tunnel client 152 can use the native on-device broadcast service 309 to broadcast risk detail information that describes the risk, indicates pending and potential actions that the management components can take if the risk continues or increases, and how the user can remediate the risk to prevent these actions.

Figure 4:
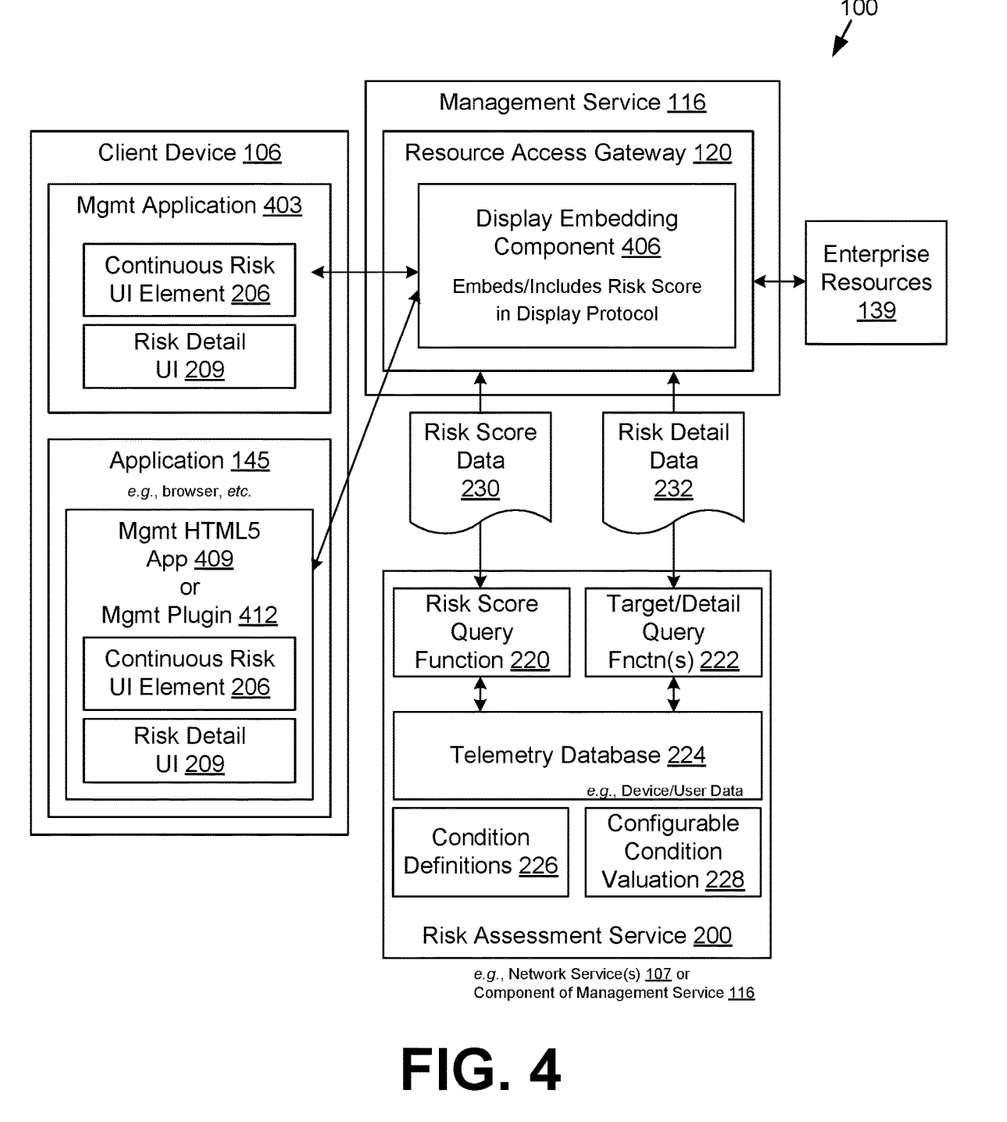
FIG. 4 is a block diagram depicting an overview of an example implementation according to various examples of the disclosure.

FIG. 4 shows another example implementation of zero trust continuous risk feedback using the components of the networked environment 100. Generally, this implementation shows how the components of the networked environment 100 can provide continuous risk feedback within a display protocol. The components of the management service 116 can communicate with a risk assessment service 200 as well as one or more client devices 106. The management service 116 can include a display embedding component 406 that operates to provide and secure access to the enterprise resources 139 in concert with a various management components executed in the client device 106 to receive and generate a display using display protocol or video streaming information.

The display embedding component 406 can operate as part of the management service 116 or a network service 107 to provide and secure access to the enterprise resources 139. In various examples, the display embedding component 406 can be an independent service, or a component of the resource access gateway 120. The resource access gateway 120 and the display embedding component 406 can receive or retrieve risk score data 230 and risk detail data 232 by querying or subscribing to the risk score query function 220 in relation to an identifier associated with the client device 106.

The resource access gateway 120 and the display embedding component 406 can use the risk score data 230 to generate and update a streaming video or streaming image data that includes the continuous risk user interface element 206. By contrast with previous examples where the client side components can extract embedded risk score data 230 to generate the continuous risk user interface element 206, this example provides server-side generation of these interfaces. The continuous risk user interface element 206 can include a continuously or periodically updated indication of risk based on the risk score data 230.

The resource access gateway 120 and the display embedding component 406 can use the risk detail data 232 to generate and update a streaming video or streaming image data that includes the risk detail user interface 209. The risk detail user interface 209 can include detailed information that describes the risks, indicates pending and potential actions that the management components can take if the risk continues or increases, and how the user can remediate the risk to prevent these actions. In various examples, the risk detail user interface 209 can refer to an update shown using the continuous risk user interface element 206 or a separate user interface that is generated in response to a user interaction with the continuous risk user interface element 206.

The resource access gateway 120 can provide the enterprise resources 139 using management components that work in concert with the display embedding component 406 to transfer streaming display data and show it on the client device 106. As enterprise resources 139 are accessed, the components of the resource access gateway 120 can continuously or periodically receive risk score data 230 from the risk assessment service 200. The resource access gateway 120 can then embed or inject the risk score in a display protocol that is used to communicate video, image, or other display data. The display protocol can include VMware® Blast, Personal Computer over Internet Protocol (PcoIP), and other proprietary and nonproprietary display protocols.

The management application 403 can be a bespoke or customized management component executed using the client device 106. The management application 403 can reproduce a streaming video, an image, or display data on the client device 106, thereby providing the embedded continuous risk user interface element 206. User selection of the user interface element can cause the management application 403 to show the risk detail user interface 209.

Alternatively, a standard application 145 can include a management HTML5 application 409 or a management plugin 412 that is added as a management-provided module. The management-provided module can reproduce streaming video, image, or display data on the client device 106, thereby providing the embedded continuous risk user interface element 206. User selection of the user interface element can cause the management-provided module to show the risk detail user interface 209.

Figure 5:
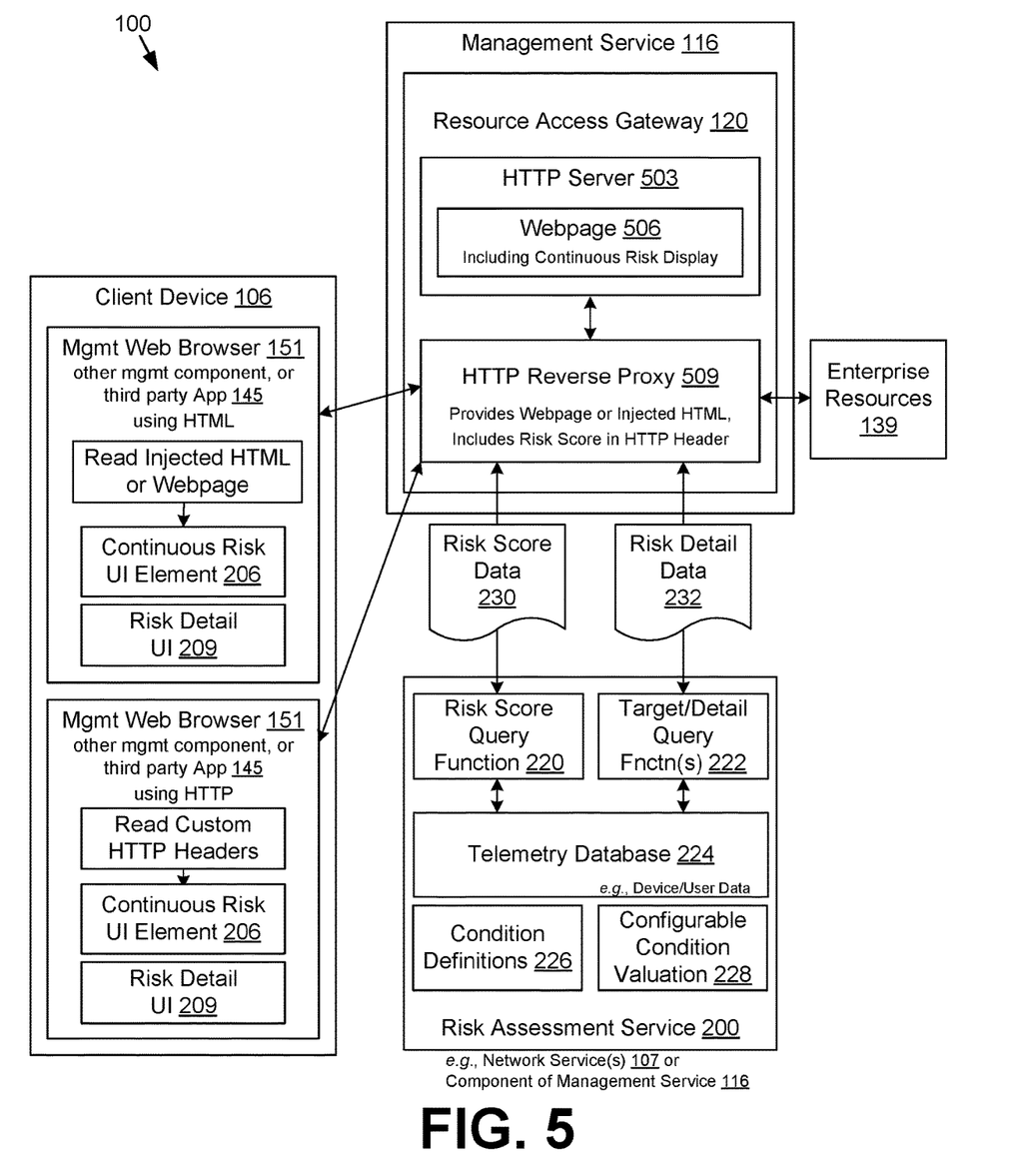
FIG. 5 is a block diagram depicting an overview of an example implementation according to various examples of the disclosure.

FIG. 5 shows another example implementation of zero trust continuous risk feedback using the components of the networked environment 100. Generally, this implementation shows how the components of the networked environment 100 can provide a server-side risk detail user interface generation as a web page or as injected Hypertext Markup Language (HTML). This can enable continuous risk feedback using a browser protocol such as HTML or HTTP. A choice between a web page or as injected HTML can be made as a configuration choice or a run-time decision based on user data 127 and device data 123.

The components of the management service 116 can communicate with a risk assessment service 200 as well as one or more client devices 106. The management service 116 can include an HTTP server 503 and an HTTP reverse proxy 509 that operates to provide and secure access to the enterprise resources 139 in concert with various management components executed in the client device 106 to receive and generate a display using web content, display protocol. or video streaming information.

The HTTP server 503 and the HTTP reverse proxy 509 can operate as part of the management service 116 or a network service 107 to provide and secure access to the enterprise resources 139. In various examples, the HTTP server 503 and an HTTP reverse proxy 509 can be an independent service, or a component of the resource access gateway 120. The resource access gateway 120, the HTTP server 503, and the HTTP reverse proxy 509 can receive or retrieve risk score data 230 and risk detail data 232 by querying or subscribing to the risk score query function 220 in relation to an identifier associated with the client device 106.

The resource access gateway 120, the HTTP server 503, and the HTTP reverse proxy 509 can work in concert using the risk score data 230 to generate and update the continuous risk user interface element 206. The continuous risk user interface element 206 can include a continuously or periodically updated indication of risk based on the risk score data 230. The resource access gateway 120, the HTTP server 503, and the HTTP reverse proxy 509 can work in concert using the risk detail data 232 to generate and update the risk detail user interface 209. The risk detail user interface 209 can include detailed information that describes the risks, indicates pending and potential actions that the management components can take if the risk continues or increases, and describes how the user can remediate the risk to prevent these actions. In various examples, the risk detail user interface 209 can refer to an update shown using the continuous risk user interface element 206 or a separate user interface that is generated in response to a user interaction with the continuous risk user interface element 206.

As enterprise resources 139 are accessed, the components of the resource access gateway 120 can continuously or periodically receive risk score data 230 from the risk assessment service 200. The resource access gateway 120 can use this information to generate the webpage 506, the injected HTML, and the HTTP headers. The resource access gateway 120 can provide a webpage 506 using the HTTP server 503. The webpage 506 can include the enterprise resources 139 as well as the risk detail user interface 209, or potentially the continuous risk user interface element 206 in various examples. The HTTP reverse proxy 509 can provide the management web browser 151 and third party app 145 with access to the webpage 506. The HTTP reverse proxy 509 can also provide injected HTML that injects user interface elements constituting the continuous risk user interface element 206 and the risk detail user interface 209 into another webpage that provides the enterprise resources 139. The webpage can be provided by a network service 107 or a component of the management service 116.

The management web browser 151 or the application 145 can read the webpage 506 or injected HTML and reproduce them for display, including the continuous risk user interface element 206 and the risk detail user interface 209. The management web browser 151 or the application 145 can read customized HTTP headers and generate the continuous risk user interface element 206 and the risk detail user interface 209.

Figure 6:
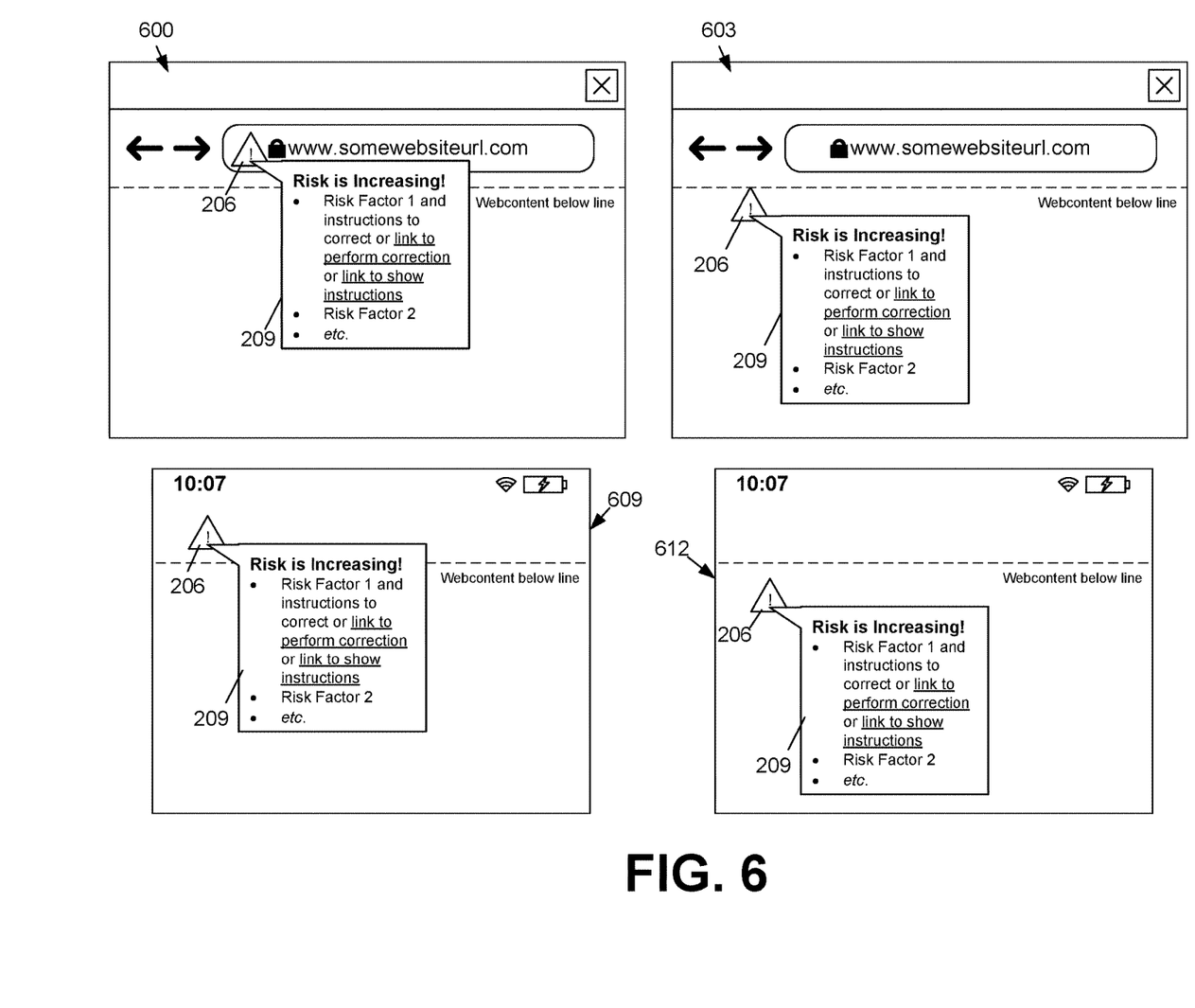
FIG. 6 includes illustrations of user interfaces that can be utilized in example implementations of the disclosure.

FIG. 6 shows a website user interface 600, a website user interface 603, an application user interface 609, and an application user interface 612. The website user interface 600, the website user interface 603, the application user interface 609, and the application user interface 612 can be user interfaces that provide enterprise resources 139. Each of the user interfaces are shown to include the continuous risk user interface element 206 and the risk detail user interface 209. Interacting with the continuous risk user interface element 206 can open the risk detail user interface 209.

The website user interface 600 shows the continuous risk user interface element 206 as an icon user interface element above or outside of a web content area indicated by the dotted web content line. This can be provided in instances where the management web browser 151, or another customized web browser is used to access the enterprise resources 139, for example as described in FIG. 5. The management web browser 151 can include functions that can affect areas in the website user interface 600 to show the continuous risk user interface element 206.

The icon user interface element is shown represented within or adjacent to a web browser address bar, in an icon area. In this case, the icon area includes the continuous risk user interface element 206 and a lock icon, which can indicate that the website is secure or using a particular protocol such as HTTP secure (HTTPS). However, the continuous risk user interface element 206 can alternatively be shown in another area.

The continuous risk user interface element 206 is shown as an exclamation point within a triangular shaped icon. However, the continuous risk user interface element 206 can be shown as any character, word, phrase, color, shade of a color, greyscale shade, icon designs, and other forms that convey a risk. In some examples, particular characters, words, phrases, colors, shades of colors, greyscale shades, icon designs, and forms can be mapped to particular risk scores and risk score ranges. A size and location of the continuous risk user interface element 206 can also be mapped to particular risk scores and risk score ranges, so that the continuous risk user interface element 206 changes size and location as the risk score increases. Risk scores and risk score ranges can also trigger the particular risk scores continuous risk user interface element 206 to flash, shake, transform shape, or perform another animation to indicate a risk level that provides risk feedback to a user. This can include automatically surfacing the risk detail user interface 209.

The risk detail user interface 209 can include detailed information that describes one or more risk factors, or the risk level currently affecting the client device 106. The risk detail user interface 209 can also indicate pending and potential actions that the management components can take if the risk continues or increases, and how the user can remediate the risk to prevent these actions. The risk detail user interface 209 can also provide a link or user interface element that the user can select to cause a management component to automatically perform an action using the client device 106 that remediates the particular risk factor. The risk detail user interface 209 can also provide a link or user interface element that the user can select to cause the risk detail user interface 209 to update itself to show additional detail on how to manually remediate the particular risk factor.

The website user interface 603 shows the continuous risk user interface element 206 as an icon user interface element within a web content area indicated by the dotted web content line. This can be provided in instances where the enterprise resources 139 are accessed as web content, for example, as shown in FIG. 2.

The website user interface 609 shows the continuous risk user interface element 206 as an icon user interface element above or outside of a web content area indicated by the dotted web content line. This can be provided in instances where the management hub 150, management tunnel client 152, management container application 153, or customized application is used to access the enterprise resources 139, for example, as described in FIGS. 2, 4, and 5. These management components can include functions that can affect areas in the website user interface 600 to show the continuous risk user interface element 206.

The application user interface 612 shows the continuous risk user interface element 206 as an icon user interface element within a web content area indicated by the dotted web content line. This can be provided in instances where the enterprise resources 139 are accessed as web content, for example, as shown in FIG. 5.

While the examples can show the risk detail user interface 209 as being integrated with the respective interface, similar risk detail feedback information can also be generated as its own application user interface that can open, for example, in a separate window, pop over, pop under, or otherwise be surfaced on a client device 106. While a web content line is provided as an example of what can be provided in examples where web content is shown in a user interface, the user interfaces can also omit web content.

Figure 7:
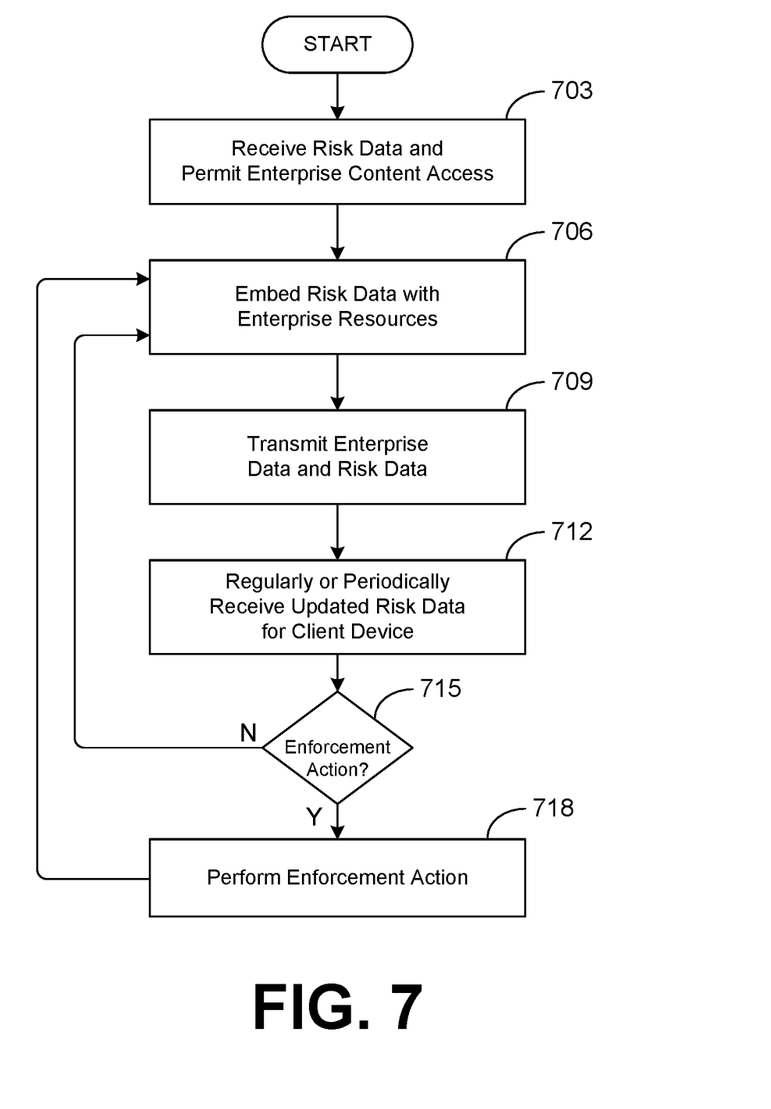
FIG. 7 is a flowchart that illustrates functionality according to an example of the disclosure.

FIG. 7 shows a flowchart that provides one example of how the various components of the management service 116 can operate to provide continuous risk feedback for a client device 106. While the steps can be generally discussed as performed by the management service 116, the other components of the networked environment 100 can perform certain aspects of the steps.

At step 703, the management service 116 can receive risk data and permit access to enterprise resources 139. As discussed earlier, the management service 116 can include a number of different components that can operate to provide and secure access to enterprise resources 139. The management service 116 can identify that a client device 106 has provided authentication information such as a username and password, certificates, tokens, and other items. The management service 116 can also identify risk data including the current risk score data 230 and risk detail data 232 from the risk assessment service 200. The management service 116 can also identify user data 127 and device data 123. The management service 116 can use all or a subset of this information to identify a security posture of the client device 106 and ultimately determine whether to enable access to enterprise resources 139. In this example, the initial access to enterprise resources 139 is enabled.

At step 706, the management service 116 can embed risk data with data that includes the enterprise resources 139. The management service 116 can integrate the risk score data 230 and risk detail data 232 with the enterprise resources 139 in a protocol used to generate a server-side generated image, video, or user interface. The management service 116 can integrate the risk score data 230 and risk detail data 232 with the enterprise resources 139 in a protocol used to transmit the enterprise resources 139 as web content and other types of data for client-side generation of a user interface. Various examples describing detailed implementations are described herein with respect to FIGS. 2-5.

At step 709, the management service 116 can transmit the risk data along with the data transmission of the enterprise resources 139 to the client device 106. The management service 116 can transmit the risk score data 230 and risk detail data 232 integrated with the enterprise resources 139 in an image or video streaming protocol, a data streaming protocol, or any data transmission protocol. The risk data integrated with the enterprise resources 139 can be considered integrated data, which can be transmitted using the protocol that is used to provide access to the enterprise resources 139.

At step 712, the management service 116 can periodically receive updated risk data for the client device 106. The management service 116 can use the first- or third-party risk assessment service 200 to generate risk score data 230 and risk detail data 232. The management service 116 can receive the risk score data 230 and risk detail data 232 by transmitting queries or requests, or by subscribing to data that includes information relevant to the client device 106 and its end user. This can include information regarding a different client device 106 enrolled by the same end user, as well as information regarding the end user's activity that isn't specific to any client device 106. In some examples, data describing user interactions can be received from the client device 106, for example, requesting risk detail data 232 for generation of a risk detail user interface 209. The management service 116 can provide pre-stored risk detail data 232 or generate, relay, or otherwise transmit a request to the risk assessment service 200 to retrieve the risk detail data 232.

At step 715, the management service 116 can determine whether to revoke access to the enterprise resources 139. As the updated risk score data 230 and risk detail data 232 is received, the management service 116 can determine whether to perform a enforcement action. In some examples, the management service 116 can also consider a duration of a particular risk score or risk factor, and can perform a set of escalating enforcement actions. If a enforcement action is to be performed, then the process can move to step 718.

However, if no enforcement action is to be performed, the management service 116 can nevertheless provide feedback to the client device 106 by moving to step 706 and 709 to provide risk data to the client device 106. In some examples, this can include triggering a command to surface the risk detail user interface 209 even if a user has not selected the continuous risk user interface element 206. As discussed above, updated risk score data 230 and risk detail data 232 can cause updated size, positioning, shape, hatching, coloring, shading, animations, and other updates to the continuous risk user interface element 206 and the risk detail user interface 209.

At step 718, the management service 116 can perform a enforcement action. This can include forcing the end user to authenticate interactively, requiring additional authentication actions such as use of multi-factor authentication (MFA), revoking access to the enterprise resources 139, unenrollment of the client device 106, commanding a management component to delete enterprise resources 139 that have been stored to the client device 106, providing notification to an administrative user, and so on.

In some cases, the end user can correct the device security even after a enforcement action. For example, if the latest security patch isn't installed on one or more of their client devices 106, or if they prevented some defensive software from running, these risks can be removed by the end user by installing the security patch or running the defensive software. The risk level can decrease in response, and the continuous risk indicator can be removed or updated to be less intrusive. Enforcement blocking actions can be cancelled and enterprise resources 139 would again be accessible.

Figure 8:
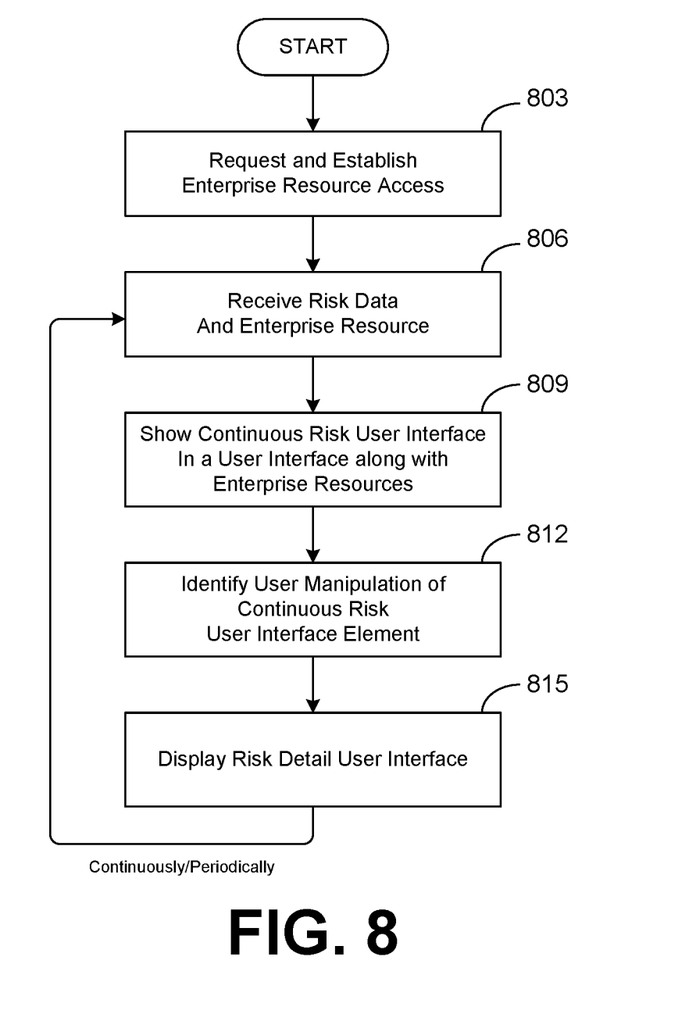
FIG. 8 is a flowchart that illustrates functionality according to an example of the disclosure.

FIG. 8 shows a flowchart that provides one example of how the management components executed using the client device 106 can operate to provide continuous risk feedback in association with enterprise resources 139 from the management service 116. While the steps can be generally discussed as performed by the client device 106, this can refer to any of the management components, operating system components, applications 145, and other components executed using the client device 106. Other hardware and software components of the networked environment 100 can perform certain aspects of the steps.

At step 803, the management service 116 can request and establish access to enterprise resources 139. The client device 106 can provide authentication information such as a username and password, certificates, tokens, and other items. The management service 116 can use this information as well as risk data including the current risk score data 230 and risk detail data 232 for the client device 106. The management service 116 can also identify user data 127 and device data 123. The client device 106 can establish access to enterprise resources 139 in concert with the components of the management service 116.

At step 806, the client device 106 can receive risk data along with a data transmission of the enterprise resources 139 to the client device 106. The client device 106 can receive risk score data 230 and risk detail data 232 integrated with the enterprise resources 139 in an image or video streaming protocol, a data streaming protocol, or any data transmission protocol.

At step 809, the client device 106 can show a continuous risk user interface element 206 within a user interface, along with the enterprise resources 139. As described with respect to various implementations of FIGS. 2-6, the continuous risk user interface element 206 can be generated server side by the management service 116 or client side by a management component.

The client device 106 can periodically receive updated risk data from the management service 116. The updated risk score data 230 and risk detail data 232 can cause updated size, positioning, shape, hatching, coloring, shading, animations, and other updates to the continuous risk user interface element 206 and the risk detail user interface 209. In some examples, the client device 106 can also receive a command to perform a enforcement action such as revoking access to the enterprise resources 139, unenrollment of the client device 106, commanding a management component to delete enterprise resources 139 that have been stored to the client device 106, providing notification to an administrative user, and so on.

At step 812, the client device 106 can identify a user manipulation or interaction with the continuous risk user interface element 206. The user can use a gesture, mouse click, or another type of user interaction to select the continuous risk user interface element 206. In some examples, the client device 106 can transmit an indication of this interaction to the management service 116.

At step 815, the client device 106 can show the risk detail user interface 209. The risk detail user interface 209 can be provided as an overlay element within the user interface providing the enterprise resources 139. The risk detail user interface 209 can be provided as a separate user interface on the client device 106.

While flowcharts can show an example of the functionality and operation herein can be embodied in hardware, software, or a combination of hardware and software. If embodied in software, each element can represent a module of code or a portion of code that includes program instructions to implement the specified logical function(s). The program instructions can be embodied in the form of source code that includes human-readable statements written in a programming language or machine code that includes machine instructions recognizable by a suitable execution system, such as a processor in a computer system or other system. If embodied in hardware, each element can represent a circuit or a number of interconnected circuits that implement the specified logical function(s).

Although flowcharts can show a specific order of execution, it is understood that the order of execution can differ from that which is shown. The order of execution of two or more elements can be switched relative to the order shown. Also, two or more elements shown in succession can be executed concurrently or with partial concurrence. Further, in some examples, one or more of the elements shown in the flowcharts can be skipped or omitted. In addition, any number of counters, state variables, warning semaphores, or messages could be added to the logical flow described herein, for purposes of enhanced utility, accounting, performance measurement, or troubleshooting aid. It is understood that all such variations are within the scope of the present disclosure.

The client device 106, or other components described herein, can each include at least one processing circuit. The processing circuit can include one or more processors and one or more storage devices that are coupled to a local interface. The local interface can include a data bus with an accompanying address/control bus or any other suitable bus structure. The one or more storage devices for a processing circuit can store data or components that are executable by the one or processors of the processing circuit. Also, a data store can be stored in the one or more storage devices.

The management service 116, identity provider 118, verification data extraction tool, management tunnel client 152, management hub 150, applications 145, and other components described herein can be embodied in the form of hardware, as software components that are executable by hardware, or as a combination of software and hardware. If embodied as hardware, the components described herein can be implemented as a circuit or state machine that employs any suitable hardware technology. The hardware technology can include one or more microprocessors, discrete logic circuits having logic gates for implementing various logic functions upon an application of one or more data signals, application specific integrated circuits (ASICs) having appropriate logic gates, programmable logic devices (e.g., field-programmable gate array (FPGAs), and complex programmable logic devices (CPLDs)).

Also, one or more or more of the components described herein that includes software or program instructions can be embodied in any non-transitory computer-readable medium for use by or in connection with an instruction execution system such as a processor in a computer system or other system. The computer-readable medium can contain, store, or maintain the software or program instructions for use by or in connection with the instruction execution system.

The computer-readable medium can include physical media, such as, magnetic, optical, semiconductor, or other suitable media. Examples of a suitable computer-readable media include, but are not limited to, solid-state drives, magnetic drives, flash memory. Further, any logic or component described herein can be implemented and structured in a variety of ways. One or more components described can be implemented as modules or components of a single application. Further, one or more components described herein can be executed in one computing device or by using multiple computing devices.

It is emphasized that the above-described examples of the present disclosure are merely examples of implementations to set forth for a clear understanding of the principles of the disclosure. While aspects of the disclosure are discussed with respect to a particular figure, the aspects can be applied in combination with the other figures. Many variations and modifications can be made to the above-described examples without departing substantially from the spirit and principles of the disclosure. All of these modifications and variations are intended to be included herein within the scope of this disclosure.

Therefore, the following is claimed:

1. A non-transitory computer-readable medium comprising machine-readable instructions, wherein the instructions, when executed by at least one processor, cause at least one computing device to at least:

permit, by a management service, a client device to access enterprise resources provided using the management service;

periodically receive, by the management service, risk data provided by a risk assessment service;

generate, by the management service, integrated data comprising the risk data and the enterprise resources provided using the management service; and transmit, by the management service to the client device, the integrated data comprising the risk data and the enterprise resources, wherein the integrated data causes the client device to provide a continuously updated risk user interface element in a user interface that provides enterprise data.

2. The non-transitory computer-readable medium of claim 1, wherein the risk data comprises risk score data and risk detail data.

3. The non-transitory computer-readable medium of claim 2, wherein the risk detail data comprises risk factors identified using device data for the client device and user data for a user associated with the client device.

4. The non-transitory computer-readable medium of claim 1, wherein the risk data is integrated with the enterprise resources using a streaming display protocol.

5. The non-transitory computer-readable medium of claim 1, wherein the risk data is integrated with the enterprise resources using a data protocol.

6. The non-transitory computer-readable medium of claim 5, wherein the data protocol provides web content comprising at least one of a website or a web application.

7. The non-transitory computer-readable medium of claim 1, wherein the risk data is integrated within an HTTP header of data comprising the enterprise resources.

8. A system comprising:
at least one computing device;
at least one application executed by the at least one computing device, wherein the at least one application causes the at least one computing device to at least:
periodically receive, by a management service, risk data provided by a risk assessment service;
generate, by the management service, integrated data comprising the risk data and enterprise resources provided using the management service; and
transmit, by the management service to a client device, the integrated data comprising the risk data and the enterprise resources, wherein the integrated data causes the client device to provide a continuously updated risk user interface element in a user interface that provides enterprise data.

9. The system of claim 8, wherein the risk data comprises risk score data and risk detail data.

10. The system of claim 9, wherein the risk detail data comprises risk factors identified using device data for the client device and user data for a user associated with the client device.

11. The system of claim 8, wherein the risk data is integrated with the enterprise resources using a streaming display protocol.

12. The system of claim 8, wherein the risk data is integrated with the enterprise resources using a data protocol.

13. The system of claim 12, wherein the data protocol provides web content comprising at least one of a website or a web application.

14. The system of claim 8, wherein the risk data is integrated within an HTTP header of data comprising the enterprise resources.

15. A method performed using instructions executed by at least one computing device, the method comprising:
periodically receiving, by a management service, risk data provided by a risk assessment service;
generating, by the management service, integrated data comprising the risk data and enterprise resources provided using the management service; and
transmitting, by the management service to a client device, the integrated data comprising the risk data and the enterprise resources, wherein the integrated data causes the client device to provide a continuously updated risk user interface element in a user interface that provides enterprise data.

16. The method of claim 15, wherein the risk data comprises risk score data and risk detail data, and the risk detail data comprises risk factors identified using device data for the client device and user data for a user associated with the client device.

17. The method of claim 15, wherein the risk data is integrated with the enterprise resources using a streaming display protocol.

18. The method of claim 15, wherein the risk data is integrated with the enterprise resources using a data protocol.

19. The method of claim 18, wherein the data protocol provides web content comprising at least one of a website or a web application.

20. The method of claim 15, wherein the risk data is integrated within an HTTP header of data comprising the enterprise resources.

* * * * *